US010814477B2

(12) United States Patent
Nishimura et al.

(10) Patent No.: US 10,814,477 B2
(45) Date of Patent: Oct. 27, 2020

(54) ROBOT

(71) Applicant: Seiko Epson Corporation, Tokyo (JP)

(72) Inventors: Yoshiteru Nishimura, Shiojiri (JP);
Seiji Hahakura, Azumino (JP);
Hidenori Hama, Shimosuwa (JP)

(73) Assignee: Seiko Epson Corporation (JP)

( * ) Notice: Subject to any disclaimer, the term of this patent is extended or adjusted under 35 U.S.C. 154(b) by 216 days.

(21) Appl. No.: 15/690,882

(22) Filed: Aug. 30, 2017

(65) Prior Publication Data

US 2018/0056506 A1 Mar. 1, 2018

(30) Foreign Application Priority Data

Aug. 31, 2016 (JP) ................................. 2016-168983
May 31, 2017 (JP) ................................. 2017-107556

(51) Int. Cl.
*B25J 9/04* (2006.01)
*B25J 9/00* (2006.01)
*B25J 9/12* (2006.01)

(52) U.S. Cl.
CPC ............ *B25J 9/042* (2013.01); *B25J 9/0009* (2013.01); *B25J 9/041* (2013.01); *B25J 9/044* (2013.01); *B25J 9/126* (2013.01)

(58) Field of Classification Search
CPC ... B25J 9/041; B25J 9/042; B25J 9/043; B25J 9/044; B25J 9/126; B25J 9/0009
See application file for complete search history.

(56) References Cited

U.S. PATENT DOCUMENTS

| RE32,794 E | * | 12/1988 | Engelberger | B25J 9/046 |
| | | | | 414/4 |
| 7,347,120 B2 | | 3/2008 | Friedrich et al. | |
| 8,831,781 B2 | * | 9/2014 | Igarashi | B25J 9/1641 |
| | | | | 700/245 |
| 2004/0222764 A1 | | 11/2004 | Miura et al. | |
| 2011/0100146 A1 | * | 5/2011 | Feng | B25J 9/044 |
| | | | | 74/490.03 |
| 2012/0279341 A1 | * | 11/2012 | Ono | B25J 9/044 |
| | | | | 74/490.01 |
| 2014/0316574 A1 | * | 10/2014 | Igarashi | B25J 9/1641 |
| | | | | 700/258 |
| 2015/0266185 A1 | * | 9/2015 | Sekine | B25J 13/088 |
| | | | | 74/490.01 |
| 2016/0036289 A1 | | 2/2016 | Kawata et al. | |
| 2017/0120435 A1 | | 5/2017 | Palich et al. | |

(Continued)

FOREIGN PATENT DOCUMENTS

DE 102008026295 A1 * 12/2009 ............. B25J 9/042
EP 3162513 A2 5/2017

(Continued)

*Primary Examiner* — Joseph Brown
(74) *Attorney, Agent, or Firm* — Harness, Dickey & Pierce, P.L.C.

(57) ABSTRACT

A robot includes an arm that rotates about a rotation axis, a motor that is provided in the arm, and an amplifier unit that includes an amplifier substrate which drives the motor and that is provided in the motor, in which, when a longitudinal direction of the arm as seen from an axial direction that is parallel to the rotation axis is a first direction and a direction orthogonal to the first direction is a second direction, the amplifier unit and the motor are arranged in a direction different from the second direction.

6 Claims, 12 Drawing Sheets

(56) References Cited

U.S. PATENT DOCUMENTS

| | | | |
|---|---|---|---|
| 2017/0133906 A1 | 5/2017 | Pfeiffer et al. | |
| 2017/0341223 A1* | 11/2017 | Hahakura | B25J 9/0009 |
| 2018/0013360 A1 | 1/2018 | Eshleman et al. | |
| 2018/0056507 A1* | 3/2018 | Hahakura | B25J 9/044 |
| 2018/0056508 A1* | 3/2018 | Hahakura | H02K 11/33 |
| 2018/0219461 A1* | 8/2018 | Hama | H02K 11/33 |

FOREIGN PATENT DOCUMENTS

| | | | | |
|---|---|---|---|---|
| JP | 2007-037238 A | | 2/2007 | |
| WO | WO-2010006812 A1 | * | 1/2010 | B25J 9/0009 |
| WO | WO-2010-090360 A1 | | 8/2010 | |
| WO | WO-2014024690 A1 | * | 2/2014 | B25J 9/042 |
| WO | WO-2014125691 A1 | * | 8/2014 | B25J 9/044 |
| WO | WO-2016-005126 A1 | | 1/2016 | |

\* cited by examiner

ROBOT

BACKGROUND

1. Technical Field

The present invention relates to a robot.

2. Related Art

In an industrial field or the like, an articulated robot with a plurality of arms is used. A technique of providing a motor and a drive circuit, which drives the motor, in an arm of an articulated robot has been known (refer to U.S. Pat. No. 7,347,120).

If a drive circuit (amplifier unit) is provided in an arm, the size of the arm increases and thus the movable range of the arm becomes narrow.

SUMMARY

A robot as an aspect of the invention includes an arm that includes an arm main body and a motor and rotates about a rotation axis, and an amplifier unit that is provided in the arm and includes an amplifier substrate which drives the motor, in which, when a longitudinal direction of the arm as seen from an axial direction that is parallel to the rotation axis is a first direction and a direction orthogonal to the first direction is a second direction, the shortest distance in the second direction between an outer edge of the arm and the motor is smaller than the thickness of the amplifier unit.

According to this configuration, it is possible to decrease a dimension along the second direction of the arm by decreasing a dimension in the second direction of a region in the arm in which the amplifier unit is disposed.

In the robot, the longest distance in the second direction between the outer edge of the arm and the motor may be smaller than the thickness of the amplifier unit.

According to this configuration, since the motor and the amplifier unit are not arranged in a transverse direction (second direction) of the arm, it is possible to decrease the dimension along the second direction of the arm.

A robot as an aspect of the invention includes an arm that rotates about a rotation axis, a plurality of motors that are provided in the arm, and an amplifier unit that is provided on each motor and includes an amplifier substrate which drives the motor, in which, when a longitudinal direction of the arm as seen from an axial direction that is parallel to the rotation axis is a first direction and a direction orthogonal to the first direction is a second direction, at least two of the plurality of motors are arranged along the second direction, and the shortest distance in the second direction between an outer edge of the arm and each of the plurality of motors that are arranged in the second direction and the shortest distance in the second direction between the plurality of motors that are arranged in the second direction are smaller than the thickness of each amplifier unit.

According to this configuration, it is possible to decrease a dimension along the second direction of the arm by decreasing a dimension in the second direction of a region in the arm in which the amplifier units are disposed.

In the robot, when a pair of motors which are positioned at the opposite outermost positions in the second direction out of the plurality of motors arranged in the second direction is a first motor and a second motor, the longest distance in the second direction between the first motor and a portion of the outer edge of the arm which is closer to a side opposite to the second motor side than the first motor is, the longest distance in the second direction between the second motor and a portion of the outer edge of the arm which is closer to a side opposite to the first motor side than the second motor is, and the longest distance in the second direction between the plurality of motors arranged in the second direction may be smaller than the thickness of the amplifier unit.

According to the configuration, since the motor and the amplifier unit are not arranged in a transverse direction (second direction) of the arm, it is possible to decrease the dimension along the second direction of the arm.

In the robot, the amplifier unit may be provided on the motor.

According to this configuration, it is possible to simplify a process of assembling the arm since the amplifier unit and the motor are integrated with each other.

A robot as an aspect of the invention includes an arm that rotates about a rotation axis, a motor that is provided in the arm, and an amplifier unit that includes an amplifier substrate which drives the motor and that is provided on the motor, in which, when a longitudinal direction of the arm as seen from an axial direction that is parallel to the rotation axis is a first direction and a direction orthogonal to the first direction is a second direction, the amplifier unit and the motor are arranged in a direction different from the second direction.

According to this configuration, a direction from the amplifier unit to the motor is a direction which is different from the transverse direction (second direction) of the arm. Therefore, it is possible to decrease the dimension along the second direction of the arm corresponding to an angle at which the amplifier unit is disposed.

In the robot, the motor and the amplifier unit may be arranged along the first direction.

According to this configuration, the motor and the amplifier unit can be arranged in the longitudinal direction (first direction) in which a free space is relatively likely to be generated in the arm. Therefore, it is possible to effectively use a space in the arm.

In the robot, the motor may be disposed closer to the rotation axis than the amplifier unit is.

According to this configuration, it is possible to dispose the motor which is heavy on the rotation axis side and thus it is possible to decrease the moment of inertia of the arm.

In the robot, the arm may include a wedge-shaped portion of which the width along the second direction decreases as the distance from the rotation axis along the first direction increases as seen from the axial direction that is parallel to the rotation axis.

According to this configuration, it is possible to decrease the projection area of the arm in plan view. As a result, it is possible to widen a movable area of the arm.

In the robot, a normal direction of the amplifier substrate may not be parallel to the first direction.

According to this configuration, it is possible to decrease the dimension along the second direction of the arm corresponding to an angle of the normal direction of the amplifier substrate.

In the robot, an angle formed between a normal direction of the amplifier substrate and the first direction may be equal to or greater than 0° and equal to or smaller than 45°.

According to this configuration, it is possible to arrange the amplifier unit and the motor in the longitudinal direction (first direction) and to decrease the dimension in the transverse direction (second direction) of the arm.

In the robot, the angle formed between the normal direction of the amplifier substrate and the first direction may be equal to or greater than 5° and equal to or smaller than 20°.

According to this configuration, it is possible to arrange the amplifier unit and the motor in the longitudinal direction (first direction) and to decrease the dimension in the transverse direction (second direction) of the arm. In addition, it is possible to arrange the amplifier unit and the motor such that the total dimension along the second direction of the amplifier unit and the motor is minimized in a case where the amplifier unit and the motor are different from each other in width dimension.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
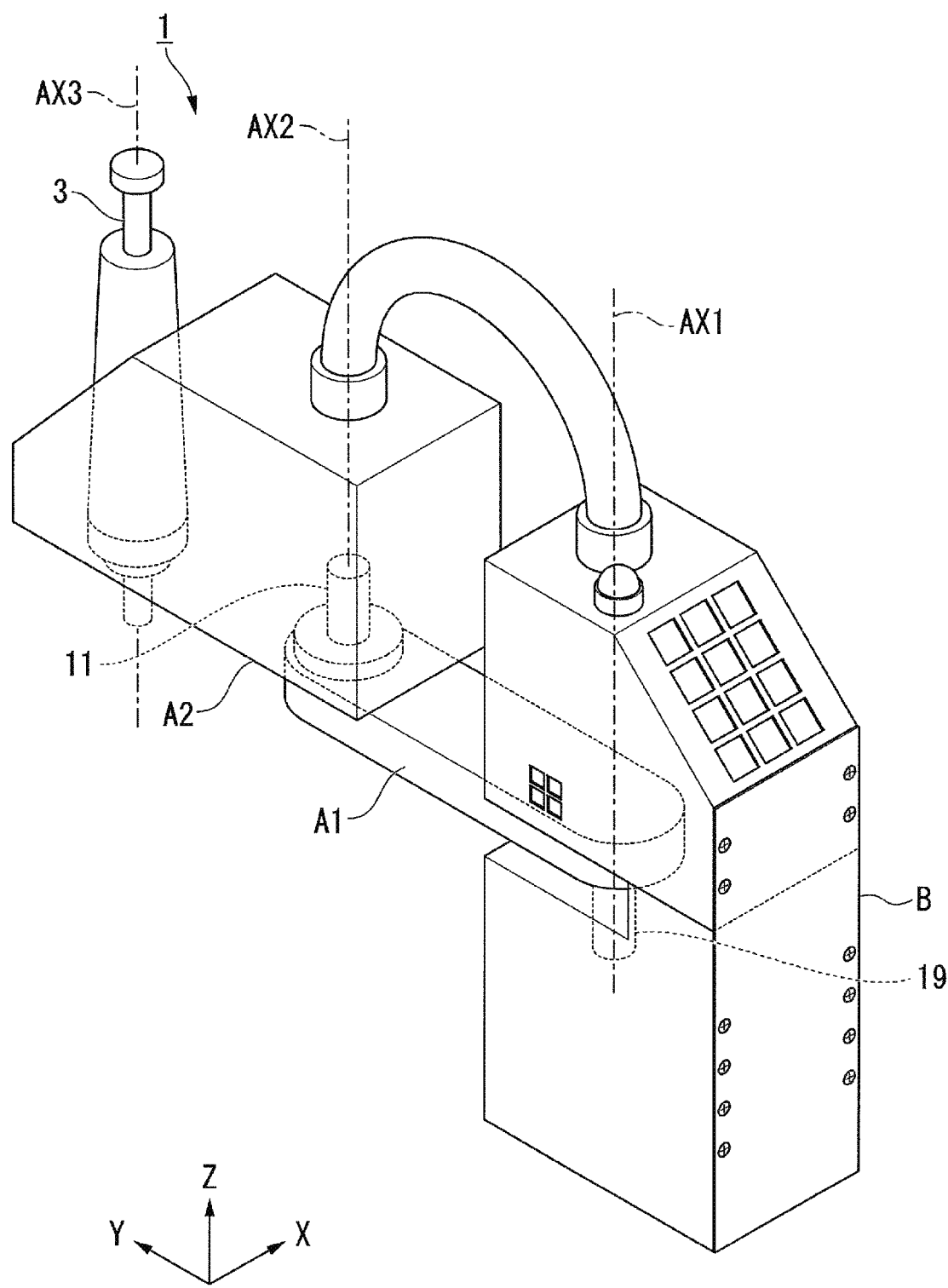
FIG. 1 is a perspective view illustrating a robot according to a first embodiment.

Hereinafter, a first embodiment will be described with reference to drawings.

For better understanding of the features of the invention and for convenience, a component that features the invention may be illustrated while being enlarged in the drawings used in the following description and the dimension ratio and the like of each component may not be the same as that in reality. In addition, an XYZ coordinate system is illustrated in each drawing. In the following description, each direction will be described on the basis of the coordinate system if necessary. In the specification, each component will be described on the assumption that a +Z direction is an upward direction. However, the posture of the robot is not limited to this.

In the specification, an expression that "along a certain direction (specified direction)" means not only "along a specified direction in the strict sense" but also "along a direction that is inclined with respect to a specified direction by less than 45°". On the contrary, in the specification, an expression that "in a certain direction (specified direction)" is used to express "in a specified direction in the strict sense".

FIG. 1 is a schematic perspective view of a robot 1 according to the first embodiment.

The robot 1 according to the first embodiment is a SCARA robot. The robot 1 includes a supporting table B, a first arm A1, a second arm A2, and an operation shaft 3.

The supporting table B is installed on an installation surface such as a floor or a wall. The first arm A1 is supported by the supporting table B. In addition, a motor unit 19 provided in the supporting table B causes the first arm A1 to rotate about a first axis AX1. The second arm A2 is supported by the first arm A1 such that the second arm A2 can rotate about a second axis AX2. The operation shaft 3 is supported by the second arm A2. The operation shaft 3 can rotate around a third axis AX3 and can perform translational motion in an axial direction that is parallel to the third axis AX3.

In the first embodiment, the supporting table B of the robot 1 is fixed to a floor that is parallel to an XY plane. In addition, the first axis AX1, the second axis AX2, and third axis AX3 are parallel to a vertical direction (Z axis direction). The first arm A1 and the second arm A2 of the robot 1 move in a direction parallel to the XY plane. In the specification, a view as seen from an axial direction that is parallel to the second axis AX2 is a plan view.

Figure 2:
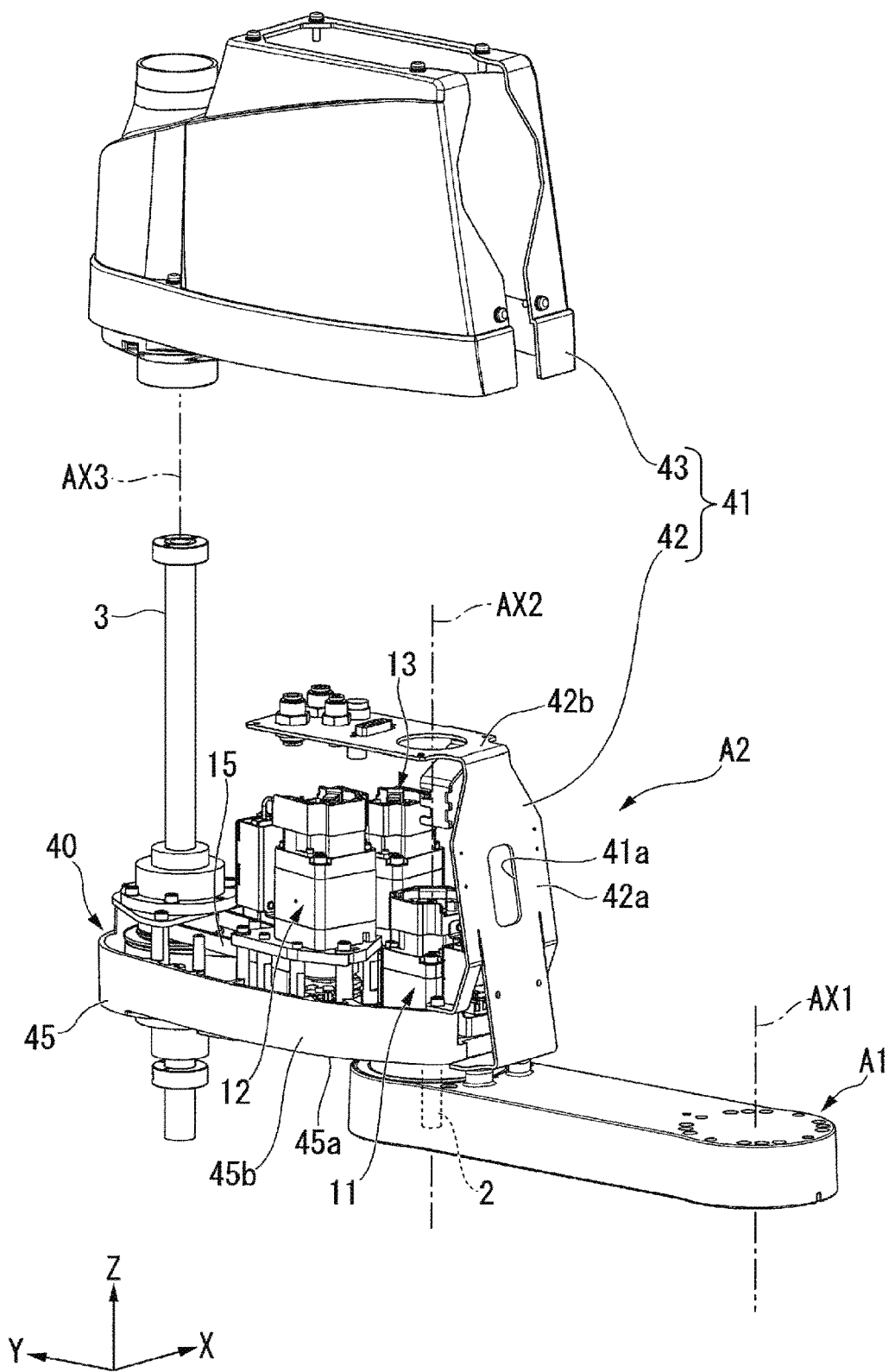
FIG. 2 is an exploded perspective view of a second arm according to the first embodiment.

FIG. 2 is an exploded perspective view of the second arm A2.

The second arm A2 includes an arm main body 40, an arm cover 41, a first motor unit 11, a second motor unit 12, a third motor unit 13, a rotation shaft 2 that extends along the second axis (rotation axis) AX2, and the operation shaft 3 that extends along the third axis (operation axis) AX3.

The arm main body 40 holds the arm cover 41, the first to third motor units 11, 12, and 13, the operation shaft 3, and the rotation shaft 2. The arm main body 40 includes a lower portion cover 45. The lower portion cover 45 includes a bottom plate portion 45a to which the first to third motor units 11, 12, and 13 are fixed from above and a side wall portion 45b that protrudes from an outer edge of the bottom plate portion 45a. The lower portion cover 45 covers a lower side of the second arm A2.

The arm cover 41 covers the first to third motor units 11, 12, and 13 (that is, plurality of motors 20 and plurality of amplifier units 30 (refer to FIG. 4)) in plan view. The arm cover 41 includes a frame body 42 and a cover main body 43. The frame body 42 is formed through sheet metal working. The frame body 42 includes an erected portion 42a that is erected upwards while being disposed beside the rotation shaft 2 and an upper end portion 42b that extends in a horizontal direction from an upper end of the erected portion 42a. A lower end of the erected portion 42a of the frame body 42 is fixed to the lower portion cover 45. The cover main body 43 is fixed to the frame body 42 and the lower portion cover 45.

Figure 3:
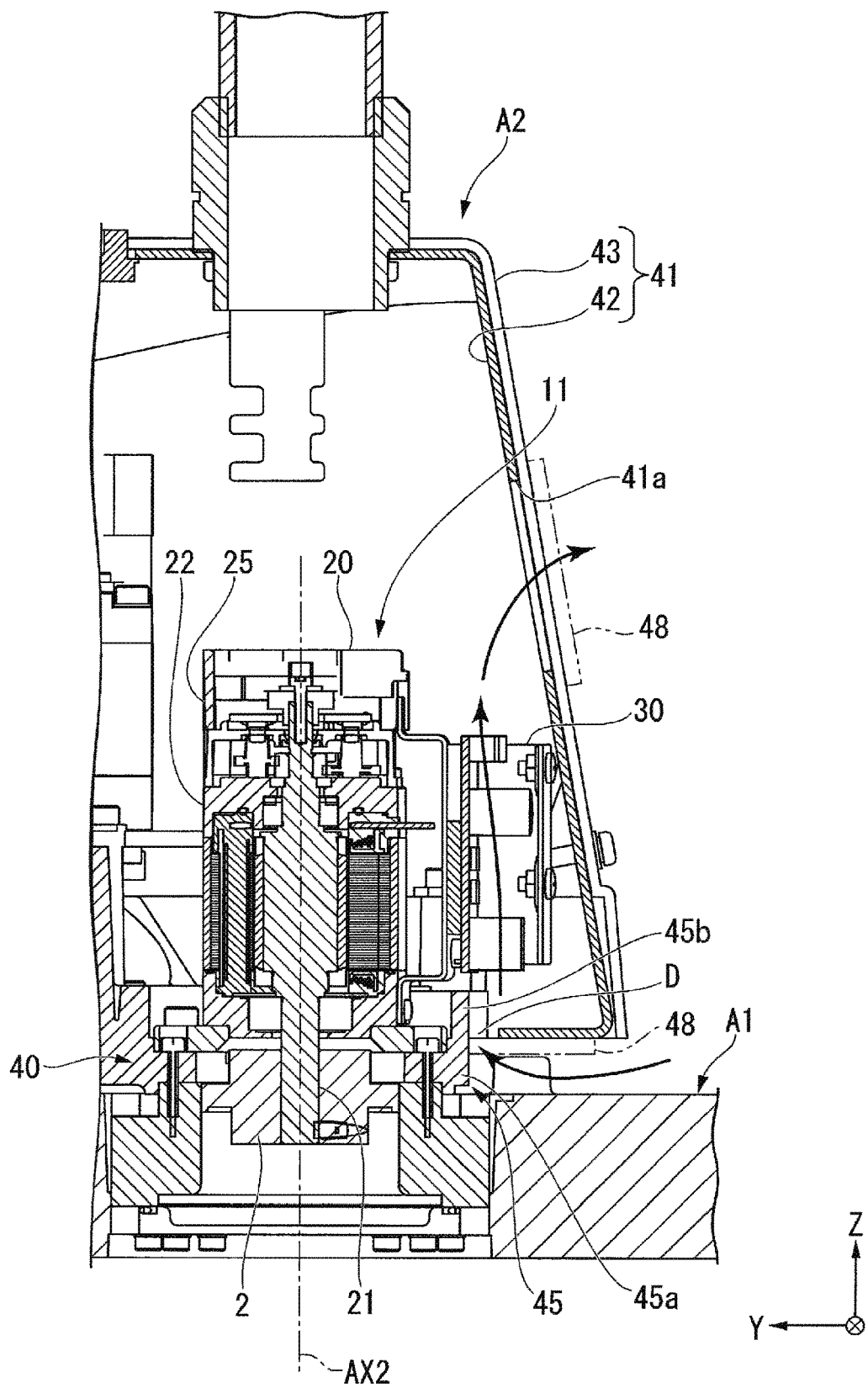
FIG. 3 is a sectional view illustrating the vicinity of a second axis of the second arm according to the first embodiment.

FIG. 3 is a sectional view illustrating the vicinity of the second axis AX2 of the second arm A2.

A gap D extending in a horizontal direction is provided between the arm cover 41 and the lower portion cover 45. That is, at the gap D, a space in the second arm A2 which is surrounded by the arm cover 41 and the lower portion cover 45 is open to the outside in the vertical direction. The gap D is positioned immediately below the amplifier unit 30 of the first motor unit 11.

In addition, the arm cover 41 is provided with a ventilation port 41a that is positioned immediately above the amplifier unit 30 of the first motor unit 11. The space in the second arm A2 which is surrounded by the arm cover 41 and the lower portion cover 45 communicates with the outside through the ventilation port 41a.

Figure 4:
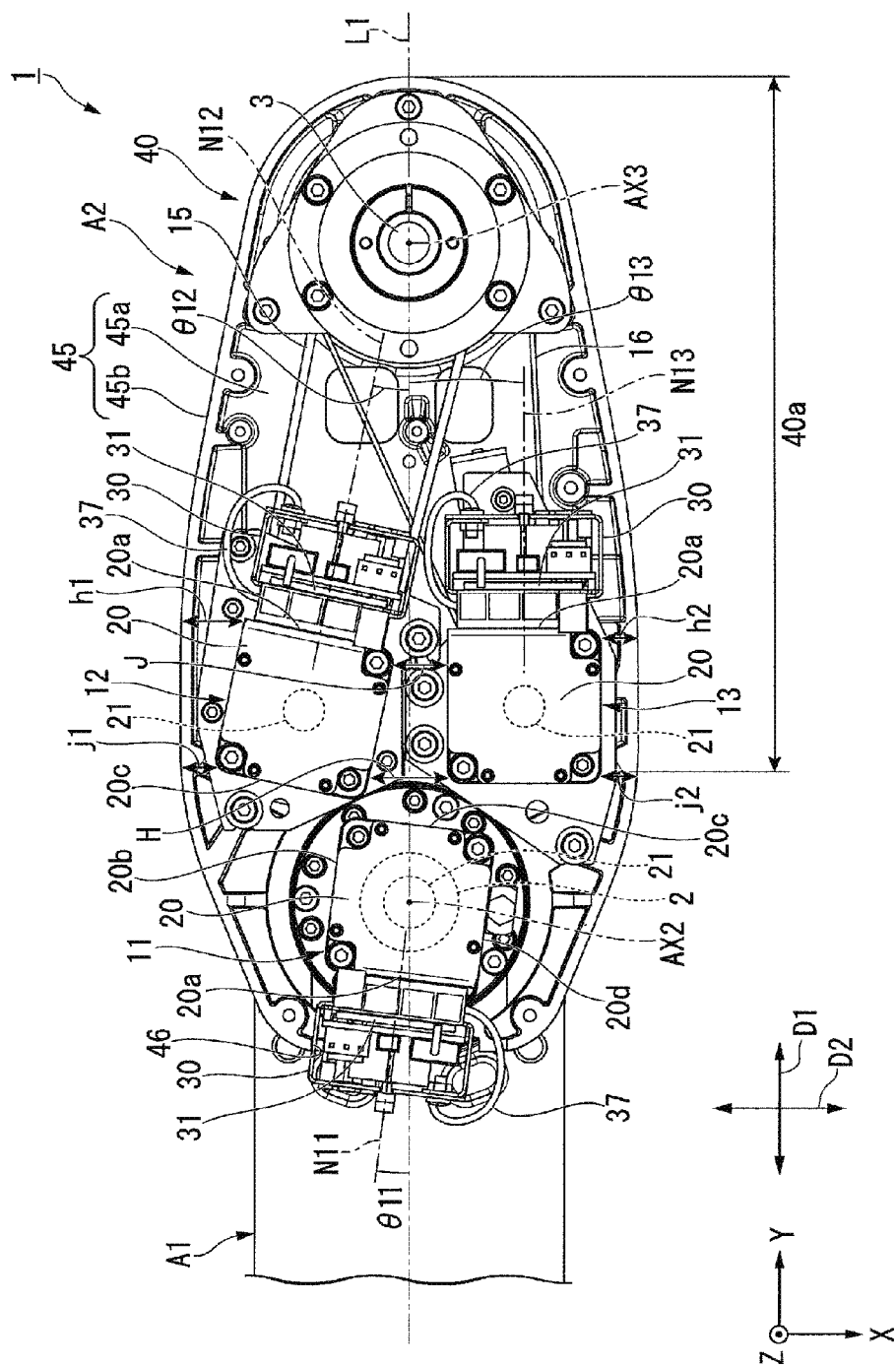
FIG. 4 is a plan view of the second arm according to the first embodiment.

FIG. 4 is a plan view of the second arm A2. FIG. 4 illustrates a state in which the arm cover 41 has been removed.

The first motor unit 11 is fixed to the arm main body 40. The first motor unit 11 drives the rotation shaft 2 to rotate relative to the arm main body 40. Since the rotation shaft 2 is fixed to the first arm A1, the second arm A2 rotates about the second axis AX2 relative to the first arm A1 when the rotation shaft 2 rotates.

The second motor unit 12 moves (lifts and lowers) the operation shaft 3 in the vertical direction. The operation shaft 3 is provided with a ball screw groove (not shown). In addition, the operation shaft 3 is supported by the arm main body 40 via a ball screw nut (not shown) that is fitted into the ball screw groove. The second motor unit 12 lifts and lowers the operation shaft 3 by rotating the ball screw nut via a timing belt 15.

The third motor unit 13 rotates the operation shaft 3 about the third axis AX3 via a timing belt 16. That is, the second motor unit 12 moves the operation shaft 3 in the vertical direction and the third motor unit 13 rotates the operation shaft 3 about the axis.

Figure 5:
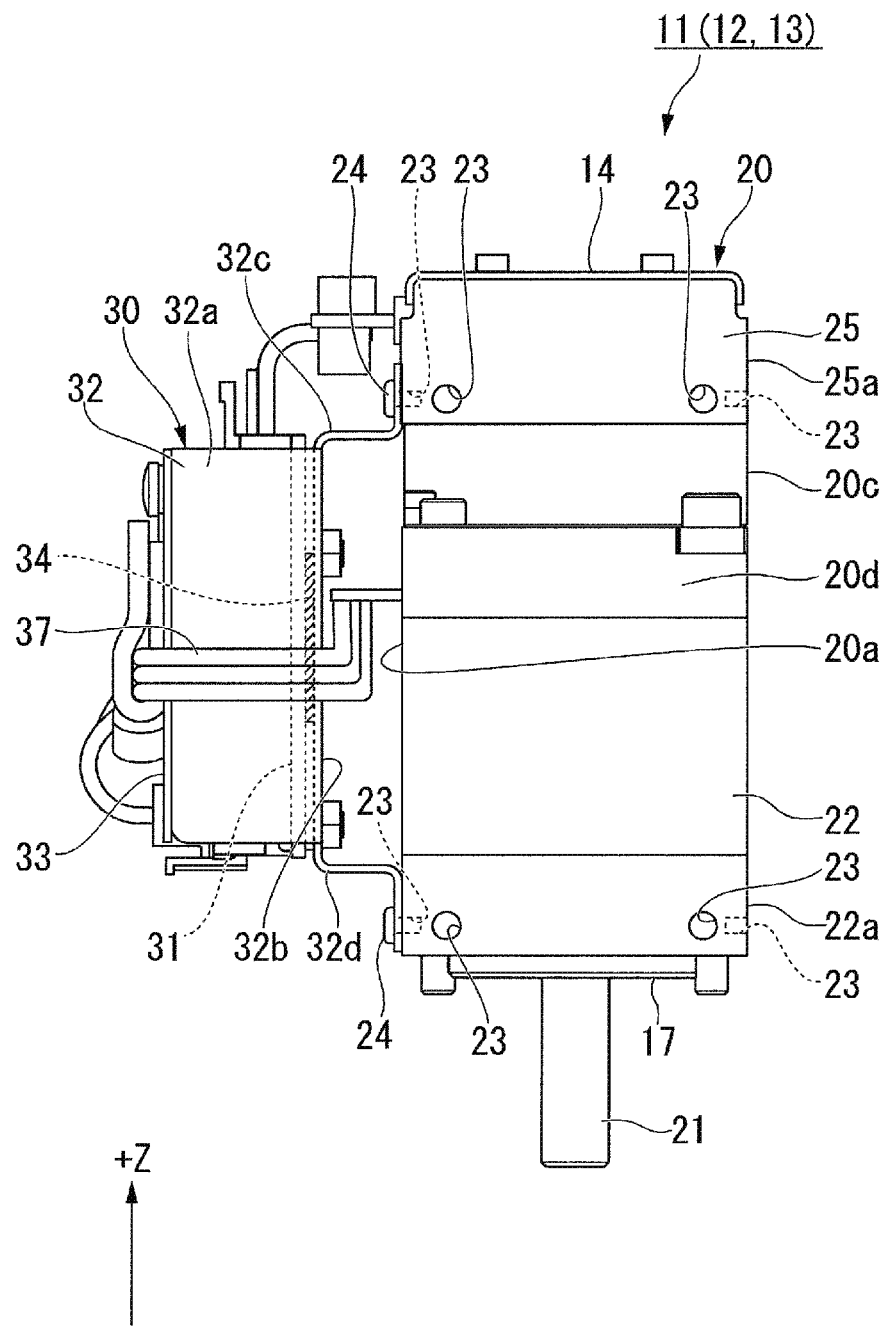
FIG. 5 is a side view of a first motor unit according to the first embodiment.

FIG. 5 is a side view of the first motor unit 11.

In the first embodiment, the first to third motor units 11, 12, and 13 have the same configuration. Unless particularly mentioned, the second and third motor units 12 and 13 also have the same configuration as in the following description related to the first motor unit 11.

The first motor unit 11 includes the motor 20 and the amplifier unit 30. The amplifier unit 30 includes an amplifier substrate 31 on which a drive circuit that drives the motor 20 is mounted.

The motor 20 is disposed with an axial direction of a shaft 21 being aligned with the Z axis direction. The motor 20 has a rectangular shape as seen from the axial direction of the shaft 21. The motor 20 has an approximately rectangular parallelepiped-like shape. The motor 20 includes the shaft 21, a motor main body 22, and an encoder 25.

The amplifier unit 30 is provided on (attached to) the motor 20. In addition, the amplifier unit 30 can be detached from the motor 20. In addition, the amplifier unit 30 is provided with a cable 37 that protrudes laterally. Any of the plurality of amplifier units 30 may be directly provided on the arm main body 40 and may be respectively fixed to the motor 20 and the arm main body 40.

The motor main body 22 and the encoder 25 are fixed to each other while being stacked in the axial direction of the shaft 21. The motor main body 22 rotates the shaft 21. The motor main body 22 according to the first embodiment is a three-phase AC motor. The motor main body 22 may be any other motor. The motor main body 22 includes a motor housing 22a that surrounds an internal structure from the outside in a radial direction of the shaft 21.

The encoder 25 detects the angle of rotation of the shaft 21. The encoder 25 may be a magnetic encoder, an optical encoder, or a combination thereof. The encoder 25 includes an encoder housing 25a that surrounds an internal structure from the outside in the radial direction of the shaft 21.

The motor 20 has an approximately rectangular parallelepiped-like shape which is vertically long and extends along the axial direction of the shaft 21. The outer peripheral surface of the motor 20 is provided with first to fourth surfaces 20a, 20b, 20c, and 20d (refer to FIG. 4 for second surface 20b) that surround the shaft 21, and a bottom surface 17 and a top surface 14 that are orthogonal to the axial direction of the shaft 21. The shaft 21 protrudes downwards from the bottom surface 17.

As illustrated in FIG. 4, the first surfaces 20a of the second and third motor units 12 and 13 face the third axis AX3 side (that is, +Y direction). In addition, the first surface 20a of the first motor unit 11 faces a side opposite to the first surfaces 20a of the second and third motor units 12 and 13.

As illustrated in FIG. 5, each of the first to fourth surfaces 20a, 20b, 20c, and 20d of the motor 20 is provided with four screw holes (attachment/detachment portions) 23. Two screw holes 23 out of the four screw holes 23 are provided on the encoder housing 25a and the other two screw holes 23 are provided on the motor housing 22a. The four screw holes 23 provided on each surface function as attachment/detachment portions for fixing the amplifier unit 30 to each surface. The amplifier unit 30 is fixed to the first surface 20a of each of the first to third motor units 11, 12, and 13 according to the first embodiment. Accordingly, the amplifier unit 30 is fixed with a screw (fixation member) 24 being inserted into each of the four screw holes 23 provided on the first surface 20a. In addition, in the first embodiment, the screw holes 23 provided on each of the second to fourth surfaces 20b, 20c, and 20d are not used.

In the first embodiment, the first surface (first position) 20a of the motor (first motor) 20 of the first motor unit 11 is provided with the four screw holes (first attachment/detachment portions) 23 via which the amplifier unit (first amplifier unit) 30 for driving the motor 20 can be attached or detached. In addition, each of the second to fourth surfaces (second to fourth positions) 20b, 20c, and 20d of the motor (first motor) 20 of the first motor unit 11 is provided with the four screw holes (second to fourth attachment/detachment portions) 23 via which the amplifier unit (first amplifier unit) 30 can be attached or detached. According to the first embodiment, the amplifier unit 30 can be attached to various positions on the motor 20. Therefore, it is possible to change the attachment position of the amplifier unit 30 according to an installation space and to cause the motor units to include the same component as each other.

In addition, in the first embodiment, the first to fourth positions (that is, first to fourth surfaces 20a, 20b, 20c, and 20d) on the motor 20 to which the amplifier unit 30 can be attached, are positioned on different surfaces of the motor 20, respectively. Therefore, it is possible to change a direction from the amplifier unit 30 to the motor 20 by changing the attachment position of the amplifier unit 30.

The first to fourth positions, to which the amplifier unit 30 can be attached, may be positioned on the same surface of the motor 20 with the heights thereof being different from each other.

Furthermore, in the first embodiment, the first to third motor units 11, 12, and 13 have the amplifier units 30 which are the same as each other. Therefore, the amplifier unit 30 of another motor unit may be attached to the motor 20 of the first motor unit 11.

The amplifier unit 30 includes the amplifier substrate 31, a bracket 32, and an amplifier cover 33. The amplifier unit 30 is fixed to the first surface 20a of the motor 20 via the bracket 32. A cable for supplying power to the amplifier unit 30 and controlling the amplifier unit 30, which is routed from the supporting table B, is connected to the amplifier unit 30. In addition, a cable for supplying power to the motor 20 and controlling the motor 20 is connected to the amplifier unit 30.

The amplifier substrate 31 amplifies power supplied from a power source and supplies the amplified power to the motor main body 22. More specifically, when the motor main body 22 is operated, the amplifier substrate 31 supplies power to a coil (not shown) for each of three phases, which the motor 20 includes, at a time corresponding to a control signal. The bracket 32 is formed of a material with a high heat conductivity, for example, aluminum.

The bracket 32 includes a pair of side plate portions 32a, a rear surface plate portion 32b, a first leg plate portion 32c, and a second leg plate portion 32d. The bracket 32 is formed through sheet metal working.

The pair of side plate portions 32a face each other with the amplifier substrate 31 being interposed therebetween. A surface direction of the pair of side plate portions 32a is orthogonal to a surface direction of the amplifier substrate 31. The pair of side plate portions 32a extends in the vertical direction.

The rear surface plate portion 32b of the bracket 32 connects the pair of side plate portions 32a to each other. The rear surface plate portion 32b is positioned between the amplifier substrate 31 and the first surface 20a of the motor 20. The rear surface plate portion 32b is disposed to extend along the amplifier substrate 31. Therefore, a surface direction of the rear surface plate portion 32b coincides with a surface direction of the amplifier substrate 31. The rear surface plate portion 32b is in contact with the amplifier substrate 31 via a heat transfer sheet 34. Meanwhile, a gap is provided between the rear surface plate portion 32b and the first surface 20a of the motor 20.

The first leg plate portion 32c of the bracket 32 extends toward the motor 20 from an upper end of the rear surface plate portion 32b. In addition, the second leg plate portion 32d extends toward the motor 20 from a lower end of the rear surface plate portion 32b. Tip end portions of the first leg plate portion 32c and the second leg plate portion 32d are bent such that the tip end portions become parallel to the first surface 20a of the motor 20 and each of the tip end portions is provided with holes through which screws are inserted. The bracket 32 is fixed to the motor 20 with the screws 24, which pass through the first and second leg plate portions 32c and 32d, being inserted into the screw holes 23 on the first surface 20a of the motor 20. In the first embodiment, each of the first and second leg plate portions 32c and 32d is a portion of the bracket 32. However, the first and second leg plate portions 32c and 32d may be formed separately from the bracket 32. In this case, each of the first and second leg plate portions 32c and 32d functions as an interposed member which is interposed between the amplifier unit 30 and the screw holes (attachment/detachment portions) 23.

The heat transfer sheet 34 is interposed between the rear surface plate portion 32b of the bracket 32 and the amplifier substrate 31. The heat transfer sheet 34 is in surface-contact with the rear surface plate portion 32b and the amplifier substrate 31. Heat generated in the amplifier substrate 31 is transferred to the bracket 32 via the heat transfer sheet 34. Since the area of an exposed portion of the bracket 32 is large, the bracket 32 is excellent in heat dissipation efficiency. The bracket 32 functions as a heat sink for emitting heat from the amplifier substrate 31.

Arrangement of Motors

Next, arrangement of the first to third motor units 11, 12, and 13 provided on the arm main body 40 will be described.

A straight line that connects the second axis AX2 and the third axis AX3 to each other as seen from the axial direction (Z axis direction) of the second axis AX2 as illustrated in FIG. 4 will be referred to as a first straight line L1. Here, a direction (Y axis direction in FIG. 4) that is parallel to the first straight line L1 will be referred to as a first direction D1. In addition, a direction that is orthogonal to the first direction D1 will be referred to as a second direction D2. A longitudinal direction of the arm main body 40 is parallel to the first direction D1 in plan view, a transverse direction of the arm main body 40 is parallel to the second direction D2 in plan view, and the arm main body 40 is formed to be long in one direction (first direction D1).

The first motor unit 11 directly drives the rotation shaft 2. The shaft 21 of the first motor unit 11 is connected to the rotation shaft 2 in a state where the centers thereof coincide with each other. Therefore, the first motor unit 11 is positioned on the second axis AX2 of the rotation shaft 2. In addition, the first motor unit 11 is positioned on the first straight line L1.

The second and third motor units 12 and 13 are arranged along the second direction. The second motor unit 12 is positioned on one of two internal regions on the arm main body 40 which are separated by the first straight line L1 in plan view and the third motor unit 13 is positioned on the other of the two internal regions.

The second and third motor units 12 and 13 are the heaviest components in components installed on the arm main body 40. If a heavy component is disposed distant from the second axis AX2 in the second arm A2 which rotates about the second axis AX2, the moment of inertia becomes great. If the moment of inertia is great, it is difficult to precisely control the second arm A2. If the second and third motor units 12 and 13 are arranged along the second direction D2, it is possible to dispose the second and third motor units 12 and 13 to be close to the second axis AX2 in comparison with a case where the second and third motor units 12 and 13 are arranged in the first direction D1. In this manner, it is possible to decrease the moment of inertial of the second arm A2.

In the first embodiment, an example in which two motor units (second and third motor units 12 and 13) out of three motor units 11, 12, and 13 are arranged along the second direction D2 has been described. However, all of the motor units 11, 12, and 13 may be arranged along the second direction D2.

In addition, here, the arrangement of the motor units 11, 12, and 13 has been described. Most of the weight of each of the motor units 11, 12, and 13 is occupied by the weight of the motor 20. Therefore, arrangement of the amplifier units 30 is not important as long as the motors 20 are arranged as described above. That is, any configuration may be adopted as long as at least two motors 20 out of the plurality of motors 20 are arranged along the second direction D2.

The motor 20 and the amplifier unit 30 of each of the first to third motor units 11, 12, and 13 are arranged along the first direction D1. That is, a direction from the amplifier unit 30 to the motor 20 of each of the first to third motor units 11, 12, and 13 extends along the first direction D1. Note that, the direction from the amplifier unit 30 to the motor 20 is a direction, in which a line that connects the center of the motor 20 (central axis of the shaft 21) to the center of the projection area of the amplifier unit 30 as seen from the center of the motor 20 extends. The size of the second arm A2 in the second direction D2 (that is, width direction) becomes large when a space in the second direction D2 that coincides with the transverse direction is secured. If the size of the second arm A2 in the width direction becomes large, the movable range of the second arm A2 becomes narrow. Since the longitudinal direction of the second arm A2 is the first direction D1, it is easy to secure an accommodation space along the first direction D1. If the motor 20 and the amplifier unit 30 are arranged along the first direction D1, it is possible to effectively use a space in the longitudinal direction of the second arm A2 and to suppress an increase in size of the second arm A2 in the second direction D2.

In the first embodiment, a case where the amplifier unit 30 and the motor 20 of each of the first to third motor units 11, 12, and 13 are arranged along the first direction D1 has been described as an example. However, if the amplifier unit 30 and the motor 20 are arranged in a direction different from the second direction D2, the above-described effect can be achieved corresponding to the angle of the amplifier unit 30. Specifically, the amplifier unit 30 and the motor 20 may be arranged in a direction (Z axis direction) that is parallel to the central axis of the shaft 21.

In each of the first to third motor units 11, 12, and 13, the motor 20 is disposed closer to the second axis AX2 than the amplifier unit 30 is. More specifically, the center of gravity of the motor 20 is closer to the second axis AX2 than the center of gravity of the amplifier unit 30 is in plan view. In each of the first to third motor units 11, 12, and 13, the motor 20 is generally heavier than the amplifier unit 30. Therefore, the center of gravity of each of the first to third motor units 11, 12, and 13, each of which includes the motor 20 and the amplifier unit 30, is positioned on the motor 20 side. It is possible to decrease the moment of inertia by positioning the center of gravity of each of the first to third motor units 11, 12, and 13 to be close to the second axis AX2 by disposing the motor 20 closer to the second axis AX2 than the amplifier unit 30 is.

As illustrated in FIG. 4, the amplifier substrates 31 of the first to third motor units 11, 12, and 13 face predetermined normal directions N11, N12, and N13 in plan view, respectively. In the first embodiment, a normal line of the amplifier substrate 31, which passes through the center of the amplifier unit 30, passes through the center of the motor 20. Therefore, the normal directions N11, N12, and N13 of the amplifier substrates 31 coincide with directions from the amplifier unit 30 to the motor 20, respectively. In the following description, the normal directions N11, N12, and N13 of the amplifier units 30 and the directions from the amplifier unit 30 to the motor 20 have the same meaning.

The normal direction N11 of the amplifier substrate 31 of the first motor unit 11 is not parallel to the first direction D1. Therefore, the amplifier unit 30 including the cable 37 can be disposed on the central position of a first opening portion 46 (which will be described later) with which the lower portion cover 45 is provided.

Since the cable 37 of the second motor unit 12 is disposed closer to the outside than the first straight line L1 is, it is necessary to suppress the cable 37 being clamped between the arm cover 41 (refer to FIG. 2) and the lower portion cover 45. Therefore, it is preferable that the dimensions of the entire second motor unit 12 including the cable 37 are regarded as the dimensions of the second motor unit 12. In the second motor unit 12, the width of the amplifier unit 30 including the cable 37 is larger than the width of the motor 20. Here, the width means a dimension in a direction orthogonal to the normal direction N12 of the amplifier substrate 31. In the first embodiment, the second motor unit 12 is disposed while being inclined such that the amplifier unit 30 faces the first straight line side. That is, the normal direction N12 of the amplifier substrate 31 of the second motor unit 12 is not parallel to the first direction D1. Since the normal direction N12 is not parallel to the first direction D1, it is easy to decrease the dimension along the second direction D2 of the entire second motor unit 12 including the cable 37 in comparison with a case where the normal direction N12 is parallel to the first direction D1. As a result, it is possible to decrease the width dimension (dimension along second direction D2) of the second arm A2.

The normal direction N13 of the amplifier substrate 31 of the third motor unit 13 is parallel to the first direction D1. Therefore, a dimension along the second direction D2 of the third motor unit 13 is small. That is, in the second arm A2, a space along the second direction D2 in which the third motor unit 13 is accommodated becomes small. As a result, it is possible to shorten a dimension along the second direction D2 of the second arm A2.

In the first embodiment, the second motor unit 12 and the third motor unit 13 are arranged along the second direction D2. That is, two motors 20 out of the plurality of motors 20 provided in the second arm A2 are arranged along the second direction D2.

In plan view, the shortest distance j1 in the second direction D2 between the motor 20 of the second motor unit 12 and an outer edge of the arm main body 40 is smaller than the thickness of the amplifier unit 30. Similarly, the shortest distance j2 in the second direction D2 between the motor 20 of the third motor unit 13 and the outer edge of the arm main body 40 is smaller than the thickness of the amplifier unit 30. Therefore, it is possible to decrease a dimension along the second direction D2 of the arm main body 40 with the distance between the motor 20 and the outer edge of the arm main body 40 being small. Furthermore, the shortest distance J in the second direction D2 between the motors 20 of the second and third motor units 12 and 13 is smaller than the thickness of the amplifier unit 30. Therefore, it is possible to decrease the dimension along the second direction D2 of the arm main body 40 with the distance between the motors 20 of the second and third motor units 12 and 13 being small.

Here, the thickness of the amplifier unit 30 means the length of the shorter of two sides of the amplifier unit 30, which has an approximately rectangular shape in plan view. In the first embodiment, the thickness of the amplifier unit 30 means the length of the amplifier unit 30 in the normal direction N12 or the normal direction N13 of the amplifier substrate 31. In addition, the outer edge of the arm main body 40 approximately coincides with the outer edge of the second arm A2 in the second direction D2.

In addition, the longest distance h1 along the second direction D2 between the motor 20 (first motor) of the second motor unit 12 and a portion of the outer edge of the arm main body 40, which is closer to a side opposite to a side close to the motor 20 (second motor) of the third motor unit 13 than the motor 20 of the second motor unit 12 is, is smaller than the thickness of the amplifier unit 30. Similarly, the longest distance h2 along the second direction D2 between the motor 20 (second motor) of the third motor unit 13 and a portion of the outer edge of the arm main body 40, which is closer to a side opposite to a side close to the motor 20 (first motor) of the second motor unit 12 than the motor 20 of the third motor unit 13 is, is smaller than the thickness of the amplifier unit 30. That is, the longest distances h1 and h2 in the second direction D2 between the motors 20, which are positioned at the opposite outermost positions in the second direction D2 out of the plurality of motors (motors 20 of second and third motor units 12 and 13), and the outer edge of the arm main body 40, which is positioned closer to the outside than the motors are, are smaller than the thickness of the amplifier unit 30. Furthermore, the longest distance H along the second direction D2 between the motors 20 of the second and third motor units 12 and 13 is smaller than the thickness of the amplifier unit 30. A gap in which the amplifier unit 30 is provided is not present between the outer edge of the arm main body 40 and the motors 20 of the second and the third motor units 12 and 13 and between the motors 20 of the second and the third motor units 12 and 13. As a result, it is possible to decrease the dimension along the second direction D2 of the second arm A2. In addition, the amplifier unit 30 and the motor 20 are arranged along the first direction D1.

In the first embodiment, the outer shape of the motor 20 of the third motor unit 13 and a portion of the outer edge of the arm main body 40 which is positioned beside the motor 20 of the third motor unit 13 are parallel to each other. Accordingly, the shortest distance j2 and the longest distance h2 between the third motor unit 13 and the outer edge of the arm main body 40 are the same as each other.

Each of angles θ11, θ12, and θ13 formed between the normal directions N11, N12, and N13 of the amplifier substrates 31 of the first to third motor units 11, 12, and 13 and the first direction D1 is preferably equal to or greater than 0° and equal to or smaller than 45° and more preferably equal to or greater than 5° and equal to or smaller than 20°. Since the normal direction N13 of the amplifier substrate 31 of the third motor unit 13 is parallel to the first direction D1, the angle θ13 is 0°. In addition, in a case of the second and third motor units 12 and 13, a positive angle within the above-described angle range is an angle that corresponds to a direction which becomes closer to the first straight line L1 as the distance from the second axis AX2 increases. Meanwhile, in a case of the first motor unit 11, since the second axis AX2 coincides with the central axis of the shaft 21 of the motor 20, whether the angle within the above-described angle range is positive or negative does not matter.

By setting the angles θ11, θ12, and θ13 to be equal to or greater than 0° and equal to or smaller than 45° and more preferably equal to or smaller than 20°, it is possible to decrease the dimension along the second direction D2 of the second arm A2. By setting the angles θ11 and θ12 to be equal to or greater than 5°, it is possible to decrease the dimension along the second direction D2 of each of the first and second motor units 11 and 12 including the cable 37. Furthermore, if the angle θ12 of the second motor unit 12 is equal to or greater than 5°, the normal directions N11 and N12 are inclined to be parallel to a direction of which the distance to the first straight line L1 decreases as the distance to the second axis AX2 increases. Therefore, as illustrated in FIG. 4, the outer shape of the arm main body 40 is formed to have a wedge-shaped portion 40a which extends along the first straight line L1 and of which the width along the second direction D2 decreases from the second axis AX2 toward the third axis AX3 in plan view. The wedge-shaped portion 40a is provided in a region from the second and third motor units 12 and 13 to the tip end on the third axis AX3 side in the longitudinal direction of the arm main body 40. Since the wedge-shaped portion 40a is provided, it is possible to decrease the projection area of the arm main body 40 in plan view. As a result, it is possible to widen a movable area of the second arm. According to the first embodiment, the angle θ12 of the second motor unit 12 is equal to or greater than 5° and the angle θ13 of the third motor unit 13 is 0°. In a case where a plurality of motor units are arranged in the second direction as described above, it is possible to achieve an effect of decreasing the projection area of the arm main body 40 in plan view by setting one of the angles to be equal to or greater than 5°.

Figure 6:
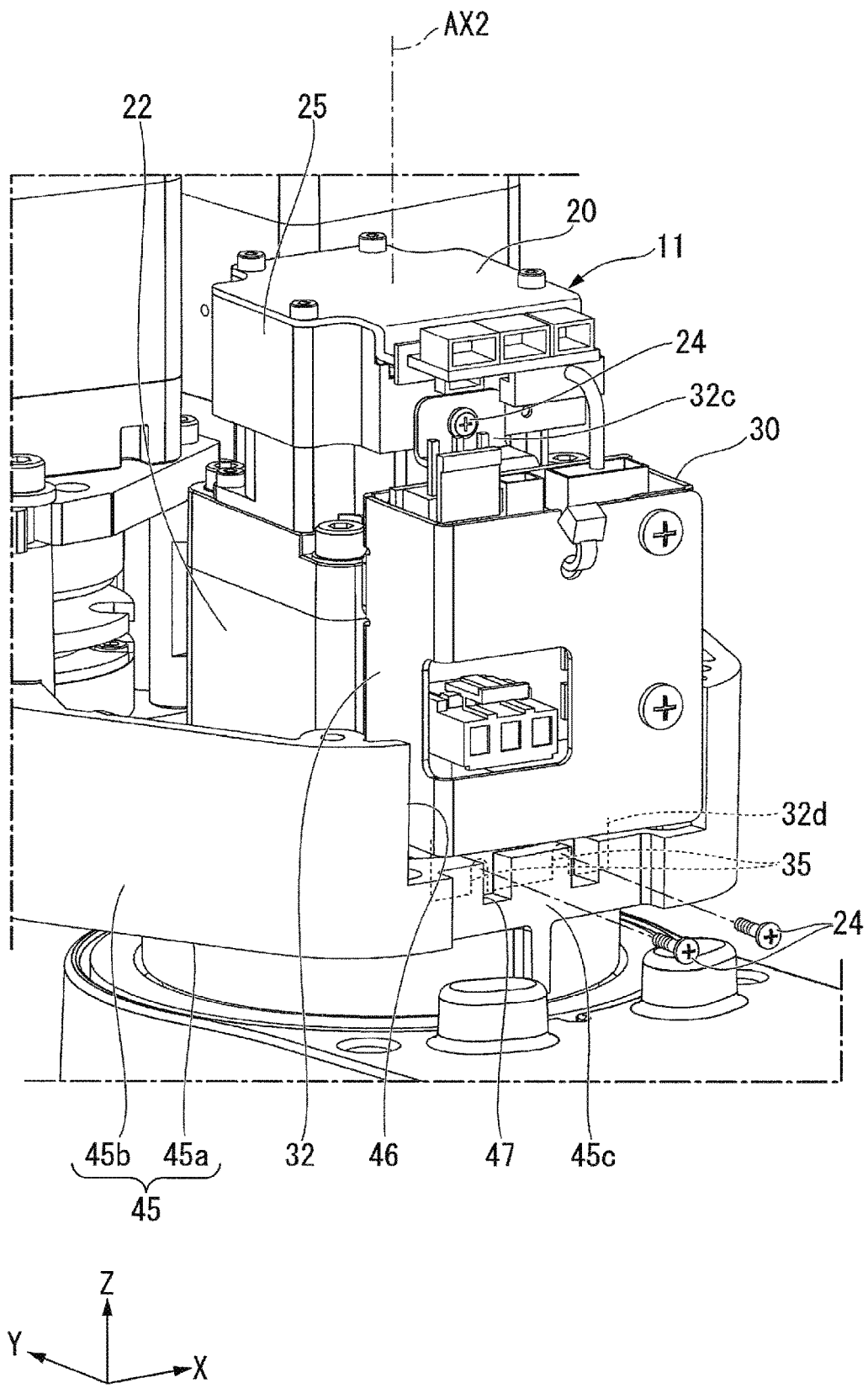
FIG. 6 is a perspective view of a portion of an arm main body according to the first embodiment.

FIG. 6 is a perspective view of a portion of the arm main body 40 and illustrates the vicinity of the first motor unit 11.

The side wall portion 45b of the lower portion cover 45 is provided with a low wall portion 45c of which the protrusion height from the bottom plate portion 45a is locally low. The first opening portion 46 that opens in the horizontal direction (direction orthogonal to second axis AX2) from the inside of the lower portion cover 45 to the outside of the lower portion cover 45 is formed above the low wall portion 45c. That is, the side wall portion 45b of the lower portion cover 45 is provided with the first opening portion 46. In addition, the low wall portion 45c is provided with notch-shaped second opening portions 47 that extend from the upper edge to the lower side. Each second opening portion 47 opens in a direction orthogonal to the second axis AX2.

The amplifier unit 30 of the first motor unit 11 is disposed in the first opening portion 46. In addition, a portion of the amplifier unit 30 of the first motor unit 11 is positioned on the outside of the arm main body 40 via the first opening portion 46. In a state where the arm cover 41 (refer to FIG. 2) has been attached to the arm main body 40, the first motor unit 11 is covered by the arm cover 41 in the horizontal direction and is covered by the arm cover 41 from above.

The amplifier unit 30 of the first motor unit 11 is fixed to the motor 20 via the first and second leg plate portions 32c and 32d of the bracket 32. The first leg plate portion 32c is positioned close to an upper end of the bracket 32 and the second leg plate portion 32d is positioned close to a lower end of the bracket 32.

The first leg plate portion 32c of the bracket 32 is provided with holes (not shown) and the screws 24 are inserted into the screw holes 23 (refer to FIG. 5) on the motor 20 side via the holes. In this manner, the first leg plate portion 32c is fixed to the motor 20.

The second leg plate portion 32d is provided with notch portions 35 that extend from the lower edge to the upper side. The screws (fixation members) 24 for fixing the amplifier unit 30 to the bracket 32 are positioned inside the notch portions 35. The second leg plate portion 32d is fixed to the motor 20 with the screws 24 positioned inside the notch portions 35 being inserted into the screw holes 23 on the motor 20 side. The second leg plate portion 32d faces the low wall portion 45c of the lower portion cover 45. Each second opening portion 47 provided in the low wall portion 45c is formed along the axis of each screw 24. An operator rotates the screws 24 while inserting a driver in each second opening portion 47.

According to the first embodiment, the lower portion cover 45 of the arm main body 40 is provided with the first opening portion 46 and a portion of the amplifier unit 30 is positioned on the outside of the arm main body 40 via the first opening portion 46 in plan view. Accordingly, it is possible to form the arm main body 40 to be compact in comparison with a case where the side wall portion 45b is formed to extend outwards from the amplifier unit 30 so that the amplifier unit 30 of the first motor unit 11 is positioned on the inside of the arm main body 40 in plan view. As a result, it is possible to widen the movable area of the arm main body 40.

In the first embodiment, a case where a portion of the amplifier unit 30 of the first motor unit 11 is positioned on the outside of the arm main body 40 has been described as an example. However, it is possible to achieve a compact arm main body if at least a portion of the amplifier unit 30 or the motor 20 is positioned on the outside of the arm main body 40 in plan view. In addition, in the first embodiment, a case where the amplifier unit 30 and the motor 20 are connected to each other to constitute a motor unit has been described as an example. However, even if the amplifier unit 30 and the motor 20 in any of the plurality of motor units are separately provided in the arm main body 40, it is possible to achieve a compact arm main body as long as at least a portion of the amplifier unit 30 or the motor 20 is positioned on the outside of the arm main body 40 in plan view. Furthermore, the plurality of motors 20 or amplifier units 30 may be positioned on the outside of the arm main body 40.

In addition, in the first embodiment, the first opening portion 46 is formed to have a notch-like shape that extends from the upper end of the side wall portion 45b to the lower side. However, the first opening portion 46 may be a through hole that penetrates the side wall portion 45b in a thickness direction thereof.

According to the first embodiment, since the amplifier unit 30 is positioned on the outside of the arm main body 40 in plan view, it is possible for an operator to access a maintenance target with ease at the time of maintenance. In addition, fixation of the second leg plate portion 32d of the amplifier unit 30 is achieved with the screws 24 that pass through the notch portions 35 of the second leg plate portion 32d. Therefore, the amplifier unit 30 can be easily detached by moving the amplifier unit 30 upwards (one direction) after unfastening the screws 24.

In the first embodiment, the first leg plate portion 32c is provided with no notch portion and the screws 24 are inserted into the holes of the first leg plate portion 32c. Therefore, when detaching the amplifier unit 30, it is necessary to remove the screws 24 that fix the first leg plate portion 32c. The first leg plate portion 32c may be provided with notch portions instead of the holes so that a process of detaching the amplifier unit 30 from the motor 20 becomes easier.

In addition, in the first embodiment, a case where the screws 24 are used as the fixation members for fixing the amplifier unit 30 to the motor 20 has been described as an example. As the fixation member, a combination of a drift pin that extends from the motor 20 and a retaining ring may be used instead of the screws.

According to the first embodiment, since the amplifier unit 30 of the first motor unit 11 is positioned on the outside of the arm main body 40, it is possible to increase the heat dissipation efficiency of the amplifier unit 30. Heat is likely to be accumulated in the arm main body 40 since the plurality of motors 20 and the plurality of amplifier units 30 are arranged in a concentrated manner. In addition, the first motor unit 11 is likely to emit heat since a torque required to drive the rotation shaft 2 is large and a working current is likely to become great. Since the amplifier unit 30 of the first motor unit 11 is positioned on the outside of the arm main body 40, it is possible to increase the heat dissipation efficiency with the amplifier unit 30 which generates a large amount of heat being separated from other heat sources (other motors and other amplifier units).

In addition, as illustrated in FIG. 3, according to the first embodiment, the gap D is provided between the arm cover 41 and the arm main body 40. Since the arm main body 40 is positioned on the outside of the amplifier unit 30, air inflowing through the gap D directly cools the amplifier unit 30. Furthermore, according to the first embodiment, since the arm cover 41 is provided with the ventilation port 41a, inflowing air can be discharged at the upper side and it is possible to achieve circulation of air that cools the amplifier unit 30. Therefore, it is possible to expect a further increase in cooling efficiency of the amplifier unit 30. In addition, since the ventilation port 41a is positioned immediately above the amplifier unit 30, it is possible to efficiently discharge air heated by the amplifier unit 30.

Note that, regarding the configuration of the ventilation port 41a of the arm cover 41, a plurality of ventilation ports 41a may be provided on a side surface of the arm cover 41 that extends in a circumferential direction of the second axis AX2 unlike the example described in the first embodiment. In this case, it is possible to introduce air into the second arm A2 through the ventilation ports each time the second arm A2 is operated.

Furthermore, as illustrated with a two-dot chain line in FIG. 3, the arm cover 41 may be provided with filters 48 that cover the gap D and the ventilation port 41a from the outside. The filters 48 may be provided inside the second arm A2. Each of the filters 48 restricts dust or the like from moving to the outside from the inside of the second arm A2 or from moving to the inside of the second arm A2 or from the outside. Therefore, it is possible to provide the robot 1 that is available in a clean room or the like. In addition, a configuration in which packing or the like covers the gap D and the ventilation port 41a so that the air-tightness of the inside of the second arm A2 is enhanced may be adopted.

Modification Example 1

Figure 7:
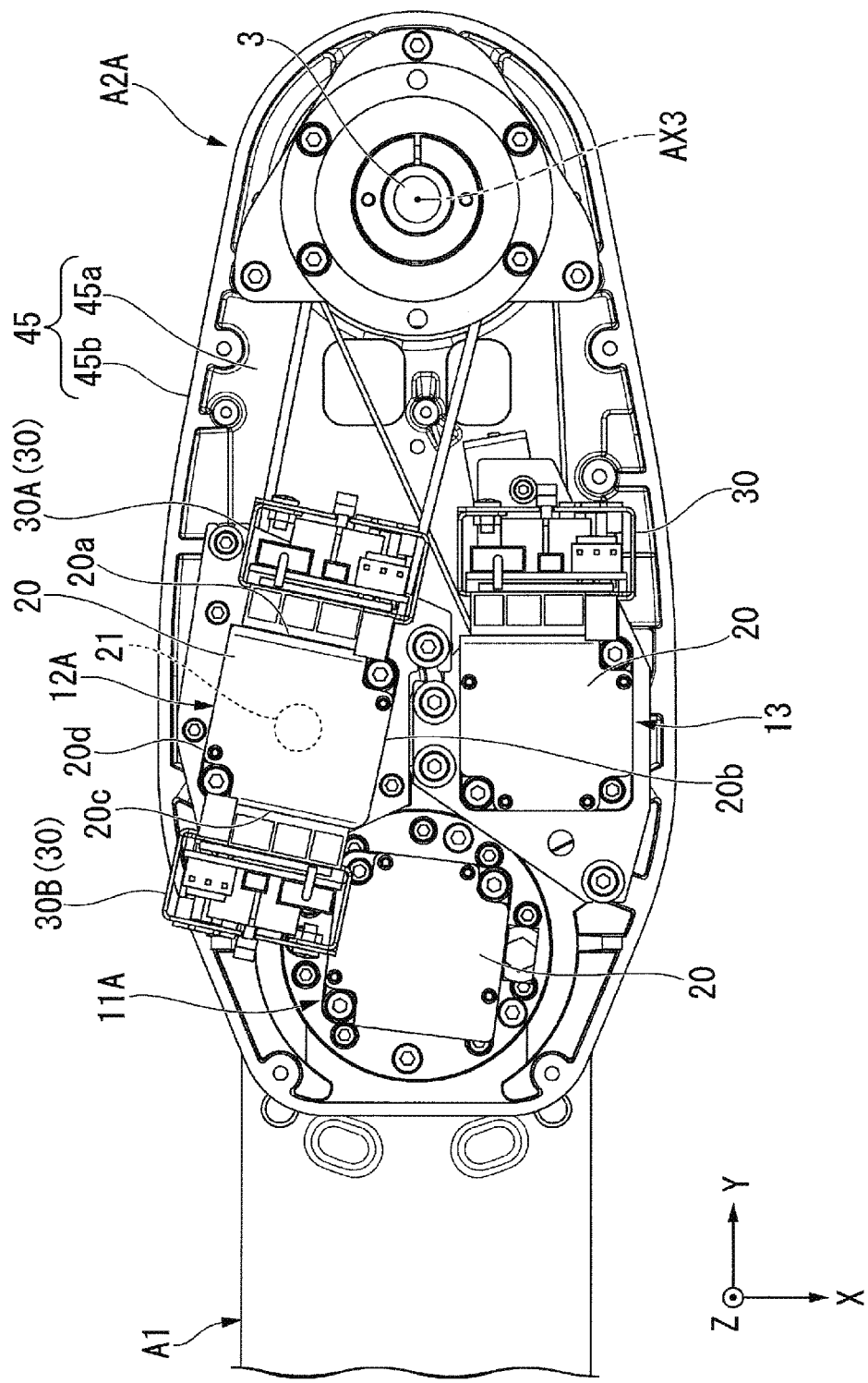
FIG. 7 is a plan view of a second arm according to Modification Example 1.

FIG. 7 is a plan view of a second arm A2A according to Modification Example 1.

Main difference between the second arm A2A according to Modification Example 1 and the second arm A2 according to the above-described embodiment is arrangement of the amplifier units 30. The same components as in the above-described embodiment are given the same symbols and description thereof will be omitted.

The second arm A2A is provided with a first motor unit 11A, a second motor unit 12A, and the third motor unit 13. Each of the first to third motor units 11A, 12A, and 13 includes the motor 20 and the amplifier unit 30. Here, the amplifier unit 30 of the first motor unit 11A will be referred to as a second amplifier unit 30B and the amplifier unit 30 of the second motor unit 12A will be referred to as a first amplifier unit 30A. At this time, both of the first and second amplifier units 30A and 30B are fixed to the motor 20 of the second motor unit 12A.

Figure 8:
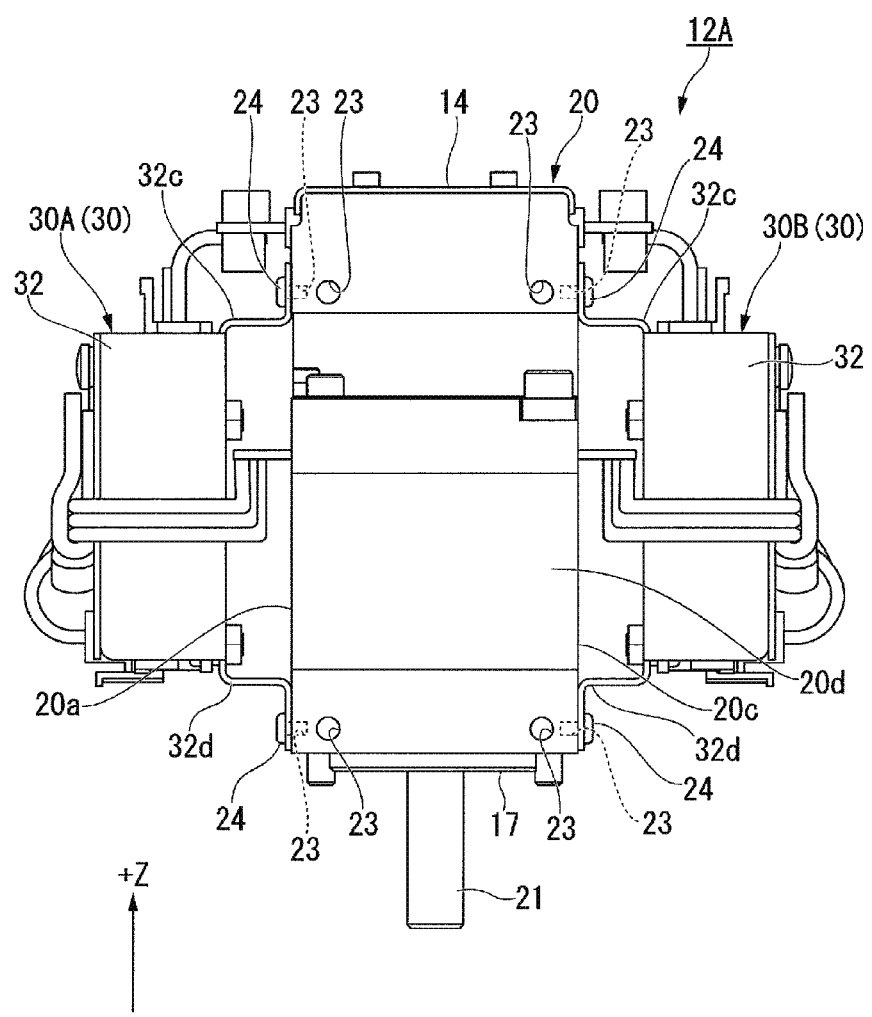
FIG. 8 is a side view of a second motor unit according to Modification Example 1.

FIG. 8 is a side view of the second motor unit 12A.

The first amplifier unit 30A is attached to the first surface 20a of the motor 20 of the second motor unit 12A and the second amplifier unit 30B is attached to the third surface 20c of the motor 20 of the second motor unit 12A. That is, the first amplifier unit 30A is detachably attached to the screw holes (first attachment/detachment portions) 23 provided on the first surface 20a of the motor 20 and the second amplifier unit 30B is detachably attached to the screw holes (second attachment/detachment portions) 23 provided on the third surface 20c.

According to Modification Example 1, since the motor 20 is provided with a plurality of attachment positions (first to fourth surfaces 20a, 20b, 20c, and 20d), it is possible to attach the plurality of amplifier units 30 to one motor 20. Accordingly, it is possible to increase the degree of freedom in arranging components in the second arm A2A. As a result, it is possible to make the second arm A2A compact.

According to Modification Example 1, the shaft (rotation axis) 21 of the motor (first motor) 20 of the second motor unit 12A is provided between the first surface 20a to which the first amplifier unit 30A is attached and the third surface 20c to which the second amplifier unit 30B is attached. That is, the first and second amplifier units 30A and 30B are disposed on the opposite sides of the motor 20 of the second motor unit 12A. Therefore, the first and second amplifier units 30A and 30B and the motor 20 are arranged in one direction in plan view. If the size of the second arm A2A in the width direction (transverse direction) becomes large, the movable range of the second arm A2A becomes narrow. Meanwhile, it is easy to secure an accommodation space in the longitudinal direction in the second arm A2A. If the first and second amplifier units 30A and 30B and the motor 20 are arranged along the longitudinal direction of the second arm A2A, it is possible to decrease the width dimension of the second arm A2A.

The bracket 32 of each of the first and second amplifier units 30A and 30B has high heat dissipation efficiency and functions as a heat sink. According to Modification Example 1, since heat of the motor 20, of which the operation frequency is high or the operation torque is great, is emitted with the plurality of amplifier units (first and second amplifier units 30A and 30B) being provided on the motor 20, it is possible to increase the operation efficiency of the motor 20.

Modification Example 2

Figure 9:
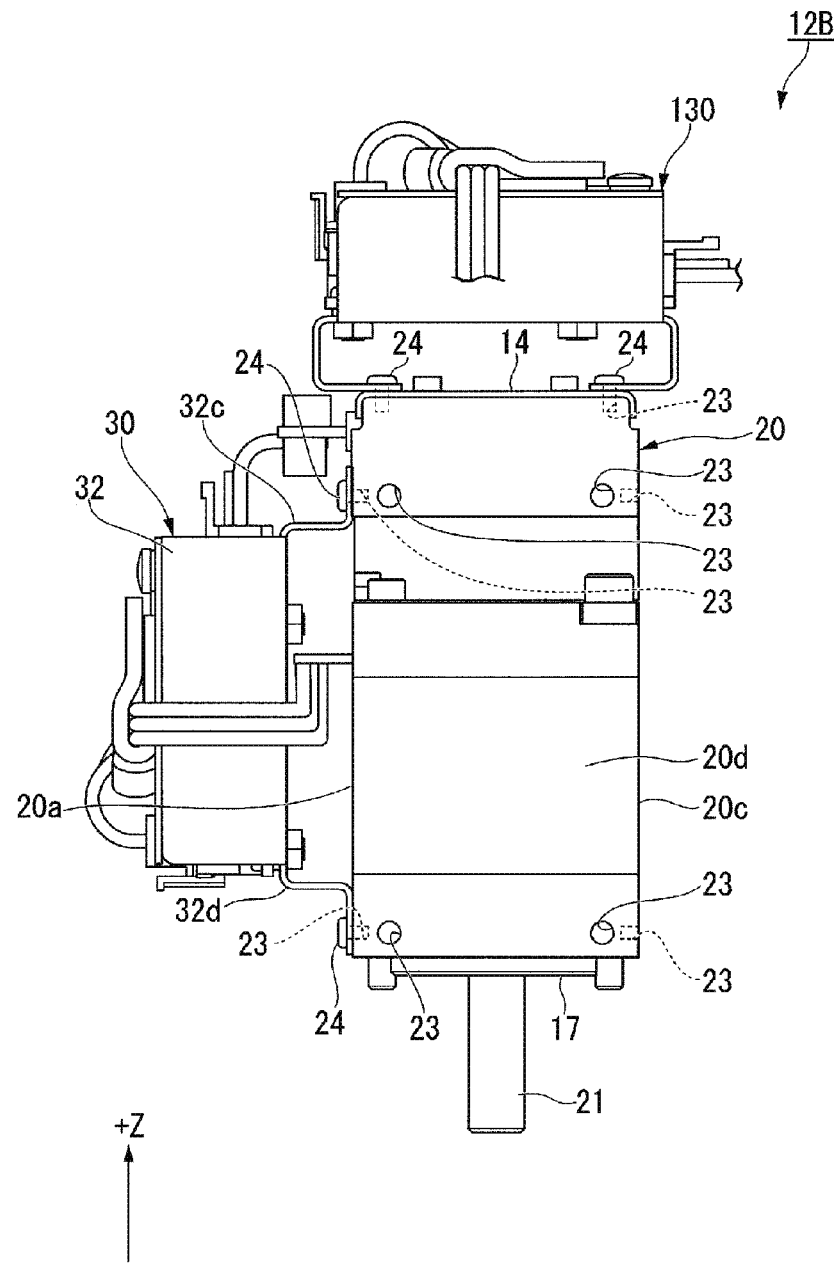
FIG. 9 is a side view of a second motor unit according to Modification Example 2.

FIG. 9 is a side view of a motor unit 12B according to Modification Example 2.

In the motor unit 12B according to Modification Example 2, one motor 20 supports two amplifier units 30 and 130 as with the second motor unit 12A in Modification Example 1.

Each of the top surface 14 and the first to fourth surfaces 20a, 20b, 20c, and 20d of the motor 20 of the motor unit 12B is provided with the screw holes (attachment/detachment portion) 23 for fixing the motor 20. In Modification Example 2, one amplifier unit 30 is fixed to the screw holes 23 of the first surface 20a of the motor 20 and the other amplifier unit 130 is fixed to the screw holes 23 of the top surface 14 of the motor 20.

According to Modification Example 2, since the amplifier unit 130 is fixed to the top surface 14 of the motor 20, it is possible to effectively use a space above the motor 20 in the second arm. As a result, it is possible to make the second arm A2 compact.

Modification Example 3

Figure 10:
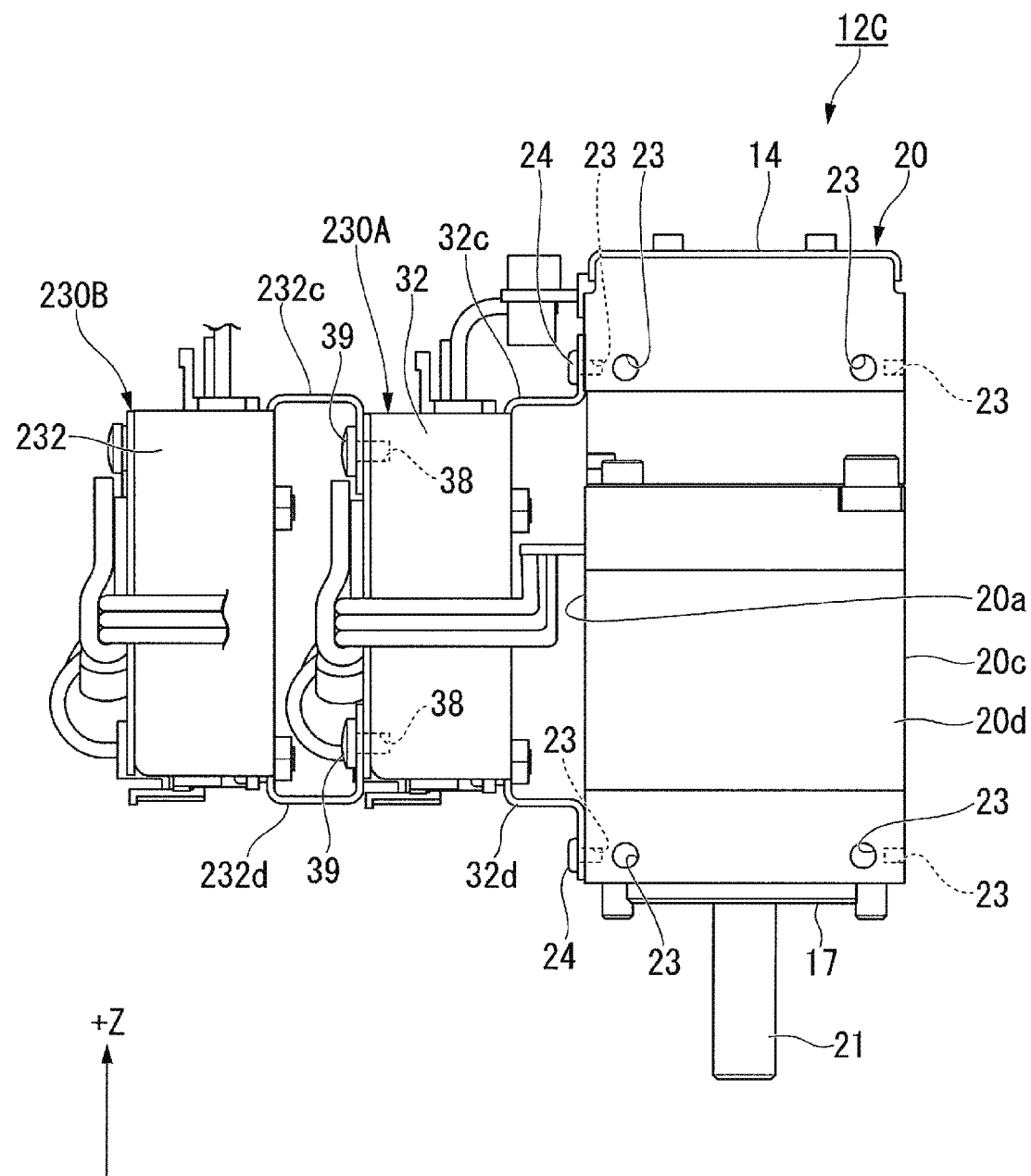
FIG. 10 is a side view of a motor unit according to Modification Example 3.

FIG. 10 is a side view of a motor unit 12C according to Modification Example 3.

In the motor unit 12C according to Modification Example 3, one motor 20 supports two amplifier units (first amplifier unit 230A and second amplifier unit 230B) as with the second motor unit 12A in Modification Example 1.

The first amplifier unit 230A drives the motor (first motor) 20 of the motor unit 12C. In addition, the second amplifier unit 230B drives the motor (second motor) 20 which is different from the motor 20 of the motor unit 12C. The relationship between the first and second amplifier units 230A and 230B and the motors 20 driven by the first and second amplifier units 230A and 230B may be opposite to that in the above description. In addition, the first and second amplifier units 230A and 230B may drive different motors 20.

The first amplifier unit 230A is fixed to the screw holes 23 provided on the first surface 20a of the motor 20 of the motor unit 12C. That is, the motor (first motor) 20 is provided with screw holes (first attachment/detachment portions) 23 via which the first amplifier unit 230A can be attached or detached.

The first amplifier unit 230A is provided with screw holes (third attachment/detachment portions) 38 via which the second amplifier unit 230B can be attached or detached. The second amplifier unit 230B is fixed to the screw holes 38 of the first amplifier unit 230A with screws 39. That is, the second amplifier unit 230B is supported by the motor 20 via the first amplifier unit 230A.

According to Modification Example 3, since the motor 20 supports the first and second amplifier units 230A and 230B overlapping each other, it is possible to increase the degree of freedom in arranging components in the second arm A2. Therefore, it is possible to make the second arm A2 compact.

In addition, according to Modification Example 3, the first and second amplifier units 230A and 230B and the motor 20 are arranged in one direction in plan view. If the first and second amplifier units 230A and 230B and the motor 20 are arranged along the longitudinal direction of the second arm A2, it is possible to decrease the width dimension of the second arm A2.

In Modification Example 3, the second amplifier unit 230B is fixed to the motor 20 via the first amplifier unit (interposed member) 230A. The first amplifier unit 230A is fixed to the screw holes (attachment/detachment portions) 23 provided on the first surface 20a of the motor 20. Therefore, the first amplifier unit 230A as an interposed member is provided between the screw holes 23 and the second amplifier unit 230B. The amplifier unit may be fixed to the motor 20 via the interposed member in this manner. Here, a case where the first amplifier unit 230A functions as an interposed member has been described as an example. However, the interposed member may be a separately prepared member.

Second Embodiment

Figure 11:
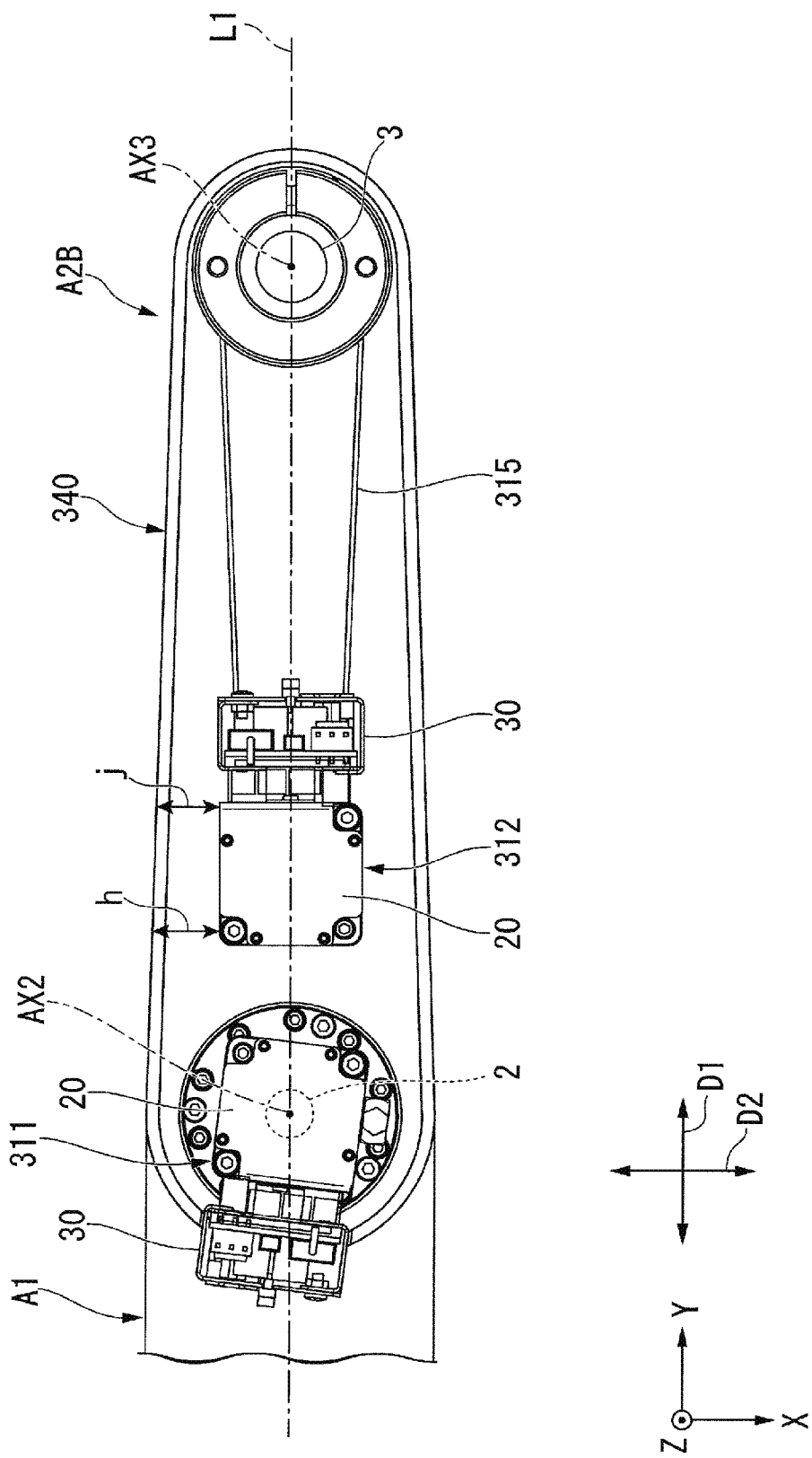
FIG. 11 is a plan view of a second arm according to a second embodiment.

FIG. 11 is a plan view of a second arm A2B according to a second embodiment.

The second arm A2B of the second embodiment is different from the second arm A2 of the first embodiment in the number of motor units provided in an arm main body 340. The same components as in the above-described embodiment are given the same symbols and description thereof will be omitted.

The second arm A2B includes the arm main body 340, a first motor unit 311, a second motor unit 312, the rotation shaft 2 that extends along the second axis (rotation axis) AX2, and the operation shaft 3 that extends along the third axis (operation axis) AX3. The arm main body 340 holds the first and second motor units 311 and 312, the operation shaft 3, and the rotation shaft 2.

Each of the first and second motor units 311 and 312 includes the motor 20 and the amplifier unit 30. The first motor unit 311 drives the rotation shaft 2 to rotate relative to the arm main body 340. The second motor unit 312 lifts and lowers the operation shaft 3 by rotating a ball screw nut via a timing belt 315.

In plan view, the shortest distance j along the second direction D2 between the motor 20 of the second motor unit 312 and an outer edge of the arm main body 340 is smaller than the thickness (that is, length of amplifier unit 30 in normal direction of amplifier substrate 31 (refer to FIG. 5)) of the amplifier unit 30. Therefore, it is possible to decrease a dimension along the second direction D2 of the arm main body 340 with the distance between the motor 20 and the outer edge of the arm main body 340 being small.

In plan view, the longest distance h along the second direction D2 between the motor 20 of the second motor unit 312 and the outer edge of the arm main body 340 is smaller than the thickness of the amplifier unit 30. Therefore, a gap in which the amplifier unit 30 is provided is not present between the outer edge of the arm main body 340 and the motor 20 of the second motor unit 312. As a result, it is possible to decrease the dimension along the second direction D2 of the second arm A2B.

Third Embodiment

Figure 12:
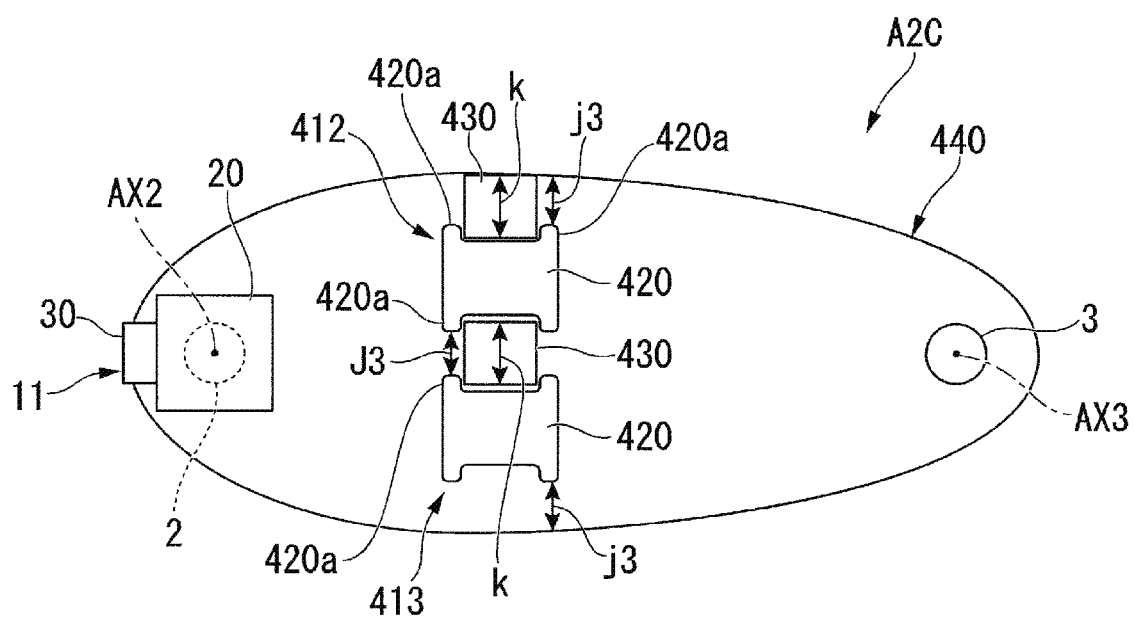
FIG. 12 is a schematic plan view of a second arm according to a third embodiment.

FIG. 12 is a schematic plan view of a second arm A2C according to a third embodiment.

The second arm A2C of the third embodiment is different from the second arm A2 of the first embodiment in configuration of a motor 420 provided in an arm main body 440. The same components as in the above-described embodiment are given the same symbols and description thereof will be omitted.

The second arm A2C includes the arm main body 440, the first motor unit 11, a second motor unit 412, a third motor unit 413, the rotation shaft 2 that extends along the second axis (rotation axis) AX2, and the operation shaft 3 that extends along the third axis (operation axis) AX3.

The first motor unit 11 has the same configuration as in the first embodiment. Each of the second and third motor units 412 and 413 includes the motor 420 and an amplifier unit 430. The second motor unit 412 lifts and lowers the operation shaft 3 by rotating a ball screw nut via a timing belt (not shown). In addition, the third motor unit 413 rotates the operation shaft 3 about the third axis AX3 via a timing belt (not shown). The second motor unit 412 and the third motor unit 413 are arranged along the second direction D2.

The motor 420 of each of the second and third motor units 412 and 413 has a rectangular shape in plan view. Each of the four corners of the motor 420 is provided with a projection portion 420a. Each projection portion 420a protrudes along the second direction D2.

The amplifier unit 430 of the second motor unit 412 and the motor 420 of the second motor unit 412 are arranged in the second direction D2. In addition, the amplifier unit 430 is positioned between the projection portions 420a of the motor 420.

The amplifier unit 430 of the third motor unit 413 and the motor 420 of the third motor unit 413 are arranged in the second direction D2 with the amplifier unit 430 of the third motor unit 413 being disposed between the motor 420 of the third motor unit 413 and the motor 420 of the second motor unit 412. In addition, the amplifier unit 430 is positioned between the projection portions 420a of the motor 420.

In plan view, the shortest distance j3 along the second direction D2 between the motor 420 of the second motor unit 412 and an outer edge of the arm main body 440 is smaller than the thickness k of the amplifier unit 430. Similarly, the shortest distance j3 along the second direction D2 between the motor 420 of the third motor unit 413 and the outer edge of the arm main body 440 is smaller than the thickness k of the amplifier unit 430. A gap of the shortest distance j3 is positioned between the projection portion 420a of the motor 420 and the outer edge of the arm main body 440. Therefore, it is possible to decrease the dimension along the second direction D2 of the arm main body 440 with the distance between the motor 420 and the outer edge of the arm main body 440 being small.

In plan view, the shortest distance J3 along the second direction D2 between the motors 420 of the second and third motor units 412 and 413 is smaller than the thickness k of the amplifier unit 430. A gap of the shortest distance J3 is positioned between the projection portions 420a of the motors 420 of the second and third motor units 412 and 413. Therefore, it is possible to decrease the dimension along the second direction D2 of the arm main body 440 with the distance between the motors 420 of the second and third motor units 412 and 413 being small.

In addition, a recess portion is formed between the projection portions 420a of the motor 420. The recess portion is formed by causing an unnecessary space of the motor 420 to be recessed. That is, according to the third embodiment, since the amplifier unit 430 is disposed with the recess portion formed in the unnecessary space of the motor 420, it is possible to decrease the dimension in the transverse direction of the second arm A2C even in a case where the amplifier units 430 are arranged in the second direction D2.

As described in the third embodiment, even if the motor 420 and the amplifier unit 430 are arranged in the second direction, since the shortest distances J3 and j3 are smaller than the thickness k of the amplifier unit 430, it is possible to achieve a predetermined effect for reduction in size of the arm main body 440.

Hereinabove, various embodiments of the invention have been described. However, the components and combinations thereof in each embodiment are merely an example and addition, omission, and substitution of the components and other modifications or the like can be made without departing the gist of the invention. In addition, the invention is not limited by the embodiments.

In the above-described embodiments, a case where the robot is a horizontal articulated robot has been described as an example. The robot may be other type of robot such as a vertical articulated robot or a cartesian coordinate robot instead of a SCARA robot. The vertical articulated robot may be a single arm robot which includes one manipulator, a two-arm robot which includes two manipulators (multiple arm robot which includes two manipulators), or a multiple arm robot which includes three or more manipulators. In addition, the cartesian coordinate robot is, for example, a gantry robot.

In addition, in the above-described embodiments, the description has been made while focusing on the motor units provided in the second arm. A motor unit in a base may have the same configuration as that of the motor units provided in the second arm.

In addition, in the above-described embodiments, the description has been made while focusing on a case where the motor and the amplifier unit are integrated into the motor unit. However, in each embodiment, any of the plurality of amplifier units may be directly attached to the arm main body without being fixed to the motors. In addition, in each embodiment, any of the plurality of amplifier units may be fixed to the motor and the arm main body, respectively.

The entire disclosures of Japanese Patent Application Nos. 2016-168983, filed Aug. 31, 2016 and 2017-107556, filed May 31, 2017 are expressly incorporated by reference herein.

What is claimed is:
1. A robot comprising:
a base;
a first arm, a proximal end of the first arm being rotatably connected to the base via a first shaft;

a second arm, a proximal end of the second arm being rotatably connected to a distal end of the first arm via a second shaft, the second arm having a third shaft at a distal end thereof, the second arm including an arm main body, an arm cover covering the arm main body, the second arm extending along a first direction in a plan view;

a first motor that is disposed in the second arm, the first motor having the second shaft as a first output shaft;

a first amplifier that is directly coupled to the first motor so as to drive the first motor, the first motor and the first amplifier being arranged along the first direction in the plan view;

a second motor that is disposed in the second arm and is configured to vertically move the third shaft relative to the second arm, the second motor having a second output shaft;

a second amplifier that is directly coupled to the second motor so as to drive the second motor, the second motor and the second amplifier being arranged along the first direction in the plan view;

a third motor that is disposed in the second arm and is configured to rotate the third shaft relative to the second arm, the third motor having a third output shaft; and a third amplifier that is directly coupled to the third motor so as to drive the third motor, the third motor and the third amplifier being arranged along the first direction in the plan view, wherein the first, second, and third motors and the second and third amplifiers are completely covered by the arm cover, a shortest distance between the arm cover and a periphery of the second motor is smaller than a thickness along the first direction of the second amplifier, a shortest distance between the arm cover and a periphery of the third motor is smaller than a thickness along the first direction of the third amplifier, the second motor and the third motor are arranged along a second direction in the plan view, and the second direction is orthogonal to the first direction, and a shortest distance between the periphery of the second motor and the periphery of the third motor is smaller than the thickness along the first direction of the second amplifier and is smaller than the thickness along the first direction of the third amplifier.

2. The robot according to claim 1,
wherein the second shaft as the first output shaft of the first motor is a rotation shaft.

3. The robot according to claim 1,
wherein the arm cover includes a wedge-shaped portion in the plan view, a width of the arm cover in the plan view along the second direction decreases as a distance from the second shaft along the first direction increases.

4. The robot according to claim 1,
wherein a normal direction of the first amplifier is not parallel to the first direction.

5. The robot according to claim 1,
wherein an angle formed between a normal direction of the first amplifier and the first direction is equal to or greater than 0° and equal to or smaller than 45°.

6. The robot according to claim 5,
wherein the angle formed between the normal direction of the first amplifier and the first direction is equal to or greater than 5° and equal to or smaller than 20°.

* * * * *